United States Patent
Chen

(10) Patent No.: US 8,830,611 B1
(45) Date of Patent: Sep. 9, 2014

(54) WORKING STATES OF HARD DISKS INDICATING APPARATUS

(71) Applicants: Hong Fu Jin Precision Industry (ShenZhen) Co., Ltd., Shenzhen (CN); Hon Hai Precision Industry Co., Ltd., New Taipei (TW)

(72) Inventor: Zhen-Yu Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/137,300

(22) Filed: Dec. 20, 2013

(30) Foreign Application Priority Data

Jun. 11, 2013 (CN) .......................... 2013 1 0230273

(51) Int. Cl.
*G11B 27/36* (2006.01)

(52) U.S. Cl.
USPC .......................................................... 360/31

(58) Field of Classification Search
None
See application file for complete search history.

(56) References Cited

U.S. PATENT DOCUMENTS

| | | | | |
|---|---|---|---|---|
| 6,202,162 | B1 * | 3/2001 | Katamoto et al. | 713/320 |
| 6,546,472 | B2 * | 4/2003 | Atkinson et al. | 711/156 |
| 6,804,177 | B1 * | 10/2004 | Rieck et al. | 369/30.15 |
| 7,360,045 | B2 * | 4/2008 | Maezawa | 711/162 |
| 7,818,443 | B2 * | 10/2010 | Du et al. | 709/231 |
| 8,139,466 | B2 * | 3/2012 | Hashimoto et al. | 369/192.1 |
| 2004/0006690 | A1 * | 1/2004 | Du et al. | 713/2 |
| 2007/0195451 | A1 * | 8/2007 | Kokami | 360/78.04 |
| 2012/0290854 | A1 * | 11/2012 | Feng et al. | 713/300 |
| 2013/0321944 | A1 * | 12/2013 | Huang | 360/15 |
| 2014/0009849 | A1 * | 1/2014 | Tian et al. | 360/31 |

* cited by examiner

*Primary Examiner* — Peter Vincent Agustin
(74) *Attorney, Agent, or Firm* — Novak Druce Connolly Bove + Quigg LLP

(57) ABSTRACT

An apparatus for indicating working states of hard disks includes a south bridge chip, a CPLD controller chip, a BMC chip, and indicating lights. The south bridge chip stores hard disk information of the hard disks. The CPLD controller chip reads position signals and data signals from the hard disk information and converts the position signals and the data signals into working states signals of the hard disks. The BMC chip receives the working states signals. If working states of the hard disks changes, the BMC chip converts the working states signals into changed position signals and changed data signals. The corresponding indicating lights receive the changed position signals and the changed data signals and indicates the changed working states of the hard disks according to the changed position signals and the changed data signals.

17 Claims, 2 Drawing Sheets

WORKING STATES OF HARD DISKS INDICATING APPARATUS

BACKGROUND

1. Technical Field

The present disclosure relates to an apparatus for indicating working states of hard disks.

2. Description of Related Art

Computer systems comprise hardware and software. The hardware may include a motherboard, an optical disk drive, a hard disk drive, memory, a network card. When the computer system is running, it is necessary to know working states of the hardware components. Indicators, such as light-emitting diodes (LEDs), are used to show the working states of the hardware components, and corresponding drive circuits driving the indicators in the computer system. However, the drive circuits can only indicate active and inactive states. An abnormal state may not be indicated by the drive circuits.

Therefore, there is a need for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

In general, the word "module," as used herein, refers to logic embodied in hardware or firmware, or to a collection of software instructions, written in a programming language such as Java, C, or assembly. One or more software instructions in the modules may be embedded in firmware, such as in an erasable-programmable read-only memory (EPROM). The modules described herein may be implemented as either software and/or hardware modules and may be stored in any type of non-transitory computer-readable medium or other storage device. Some non-limiting examples of non-transitory computer-readable media are compact discs (CDs), digital versatile discs (DVDs), Blue-Ray discs, Flash memory, and hard disk drives.

Figure 1:
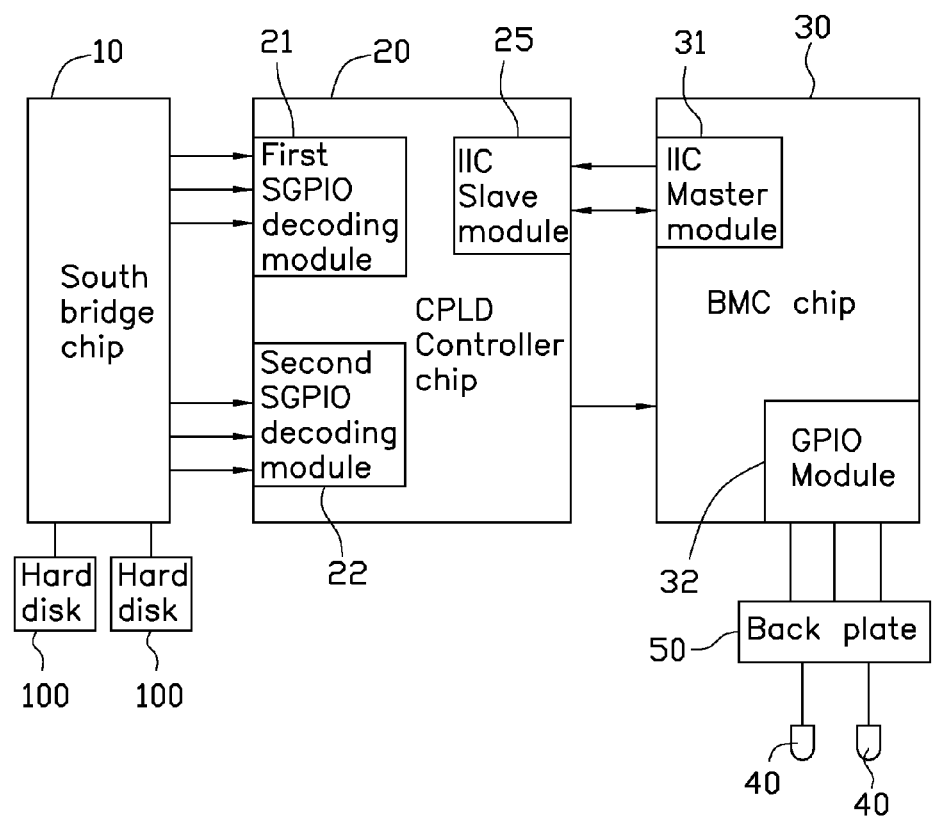
FIG. 1 is a block diagram of an embodiment of an apparatus for indicating working states of hard disks.

FIG. 1 shows an embodiment of an apparatus for indicating states of multiple hard disks 100. The apparatus includes a south bridge chip 10, a Complex Programmable Logic Device (CPLD) controller chip 20, a Baseboard Management Controller (BMC) chip 30, and multiple indicating lights 40. The multiple indicating lights 40 are located on a backplane 50. In one embodiment, the multiple hard disks 100 include Serial Advanced Technology Attachment (SATA) hard disks and Serial Attached Small Computer System Interface (SAS) hard disks.

The south bridge chip 10 is electrically connected to the multiple hard disks 100 and configured for managing the multiple hard disks 100. The south bridge chip 10 stores Serial General Purpose Input/Output (SGPIO) information and basic information of each of the multiple hard disks 100. The SGPIO information includes working states of each of the multiple hard disks 100. The basic information includes a serial number and manufacturer information of each of the multiple hard disks 100.

Figure 2:
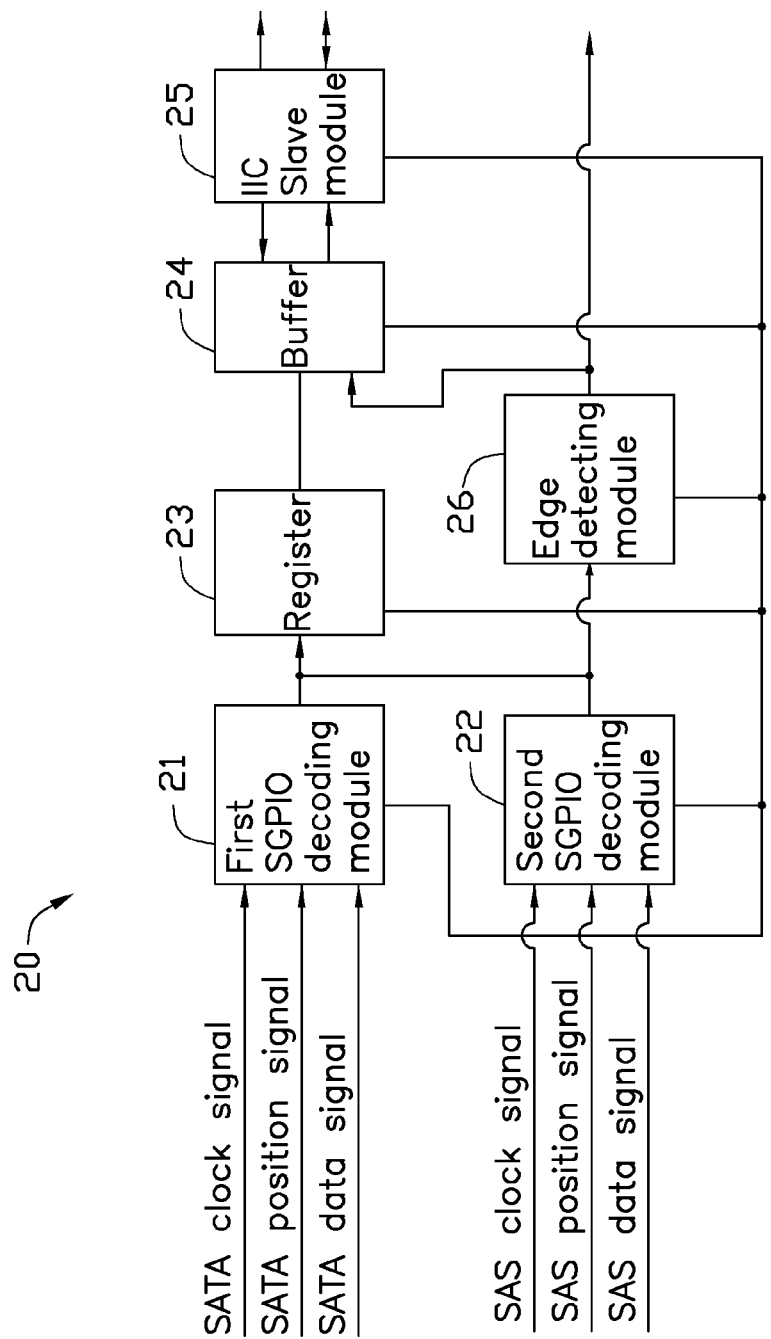
FIG. 2 is a block diagram of an embodiment of a Complex Programmable Logic Device (CPLD) control chip of FIG. 1.

FIG. 2 shows that the CPLD controller chip 20 includes a first SGPIO decoding module 21, a second SGPIO decoding module 22, a register 23, a buffer 24, an Inter-Integrated Circuit (IIC) slave module 25, and an edge detecting module 26. In one embodiment, the first SGPIO decoding module 21 is a SATA decoding module, and the second SGPIO decoding module 22 is an SAS decoding module.

The first SGPIO decoding module 21 is electrically connected to the south bridge chip 10 to receive a SATA clock signal, a SATA position signal, and a SATA data signal. The first SGPIO decoding module 21 is configured for converting the SATA clock signal, the SATA position signal, and the SATA data signal into SATA signals that can be identified by the register 23 and the edge detecting module 26.

The second SGPIO decoding module 22 is electrically connected to the south bridge chip 10 to receive an SAS clock signal, an SAS position signal, and an SAS data signal. The second SGPIO decoding module 22 is configured for converting the SAS clock signal, the SAS position signal, and the SAS data signal into SAS signals that can be identified by the register 23 and the edge detecting module 26.

The register 23 stores multiple predetermined data of hard disc working states. The CPLD controller chip 20 compares the SATA signals with the predetermined data to identify working states signals of corresponding SATA hard disks 100. The CPLD controller chip 20 compares the SAS signals with the predetermined data to identify working states signals of corresponding SAS hard disks 100.

The register 23 transmits the working states signals of the SATA hard disks 100 and the SAS hard disks 100 to the IIC slave module 25 via the buffer 24. The first SGPIO decoding module 21 and the second SGPIO decoding module 22 transmit the working states signals of the SATA hard disks 100 and the SAS hard disks 100 to the edge detecting module 26. The edge detecting module 26 outputs a write data signal and an interrupt signal to the buffer 24 and the BMC chip 30, respectively.

FIGS. 1 and 2 show that the BMC chip 30 includes an IIC master module 31 and a GPIO module 32. The IIC master module 31 receives the working states signals of the SATA hard disks 100 and the SAS hard disks 100 from the IIC slave module 25. The GPIO module 32 is configured for converting the working statues signals of the SATA hard disks 100 and the SAS hard disks 100 into clock signals, position signals and data signals. The GPIO module 32 transmits the clock signals, the position signals, and the data signals to the backplane 50. The backplane 50 is configured for indicating working states of the SATA hard disks 100 and the SAS hard disks 100 by shining the indicating lights 40 according to the clock signals, the position signals, and the data signals.

In one embodiment, each of the multiple indicating lights 40 is configured for indicating a working states of a corresponding hard disk 100. For example, if the indicating light 40 does not emit any light, the corresponding hard disk 100 is not connected to the apparatus. If the indicating light 40 emits green light, the corresponding hard disk 100 works normally and is in the inactive state. If the indicating light 40 flashes green light, the corresponding hard disk 100 works normally and is in the active state. If the indicating light 40 emits red light, the corresponding hard disk 100 is in the abnormal state.

In use, if the working states of the hard disks 100 remains unchanged, the edge detecting module 26 does not output the write data signals and the interrupt signals. The BMC chip 30 remains in the present working states and outputs the clock signal, the position signal, and the data signal of the last clock time. The backplane 50 indicates working states of the multiple hard disks 100 according to the last clock time by shining the indicating lights 40. If a working states of a hard disk 100 changes, the edge detecting module 26 outputs the corresponding write data signal and the corresponding interrupt signal, and the buffer 24 reads changed SATA signals and changed SAS signals from the register 23. The BMC chip 30 converts the changed clock signal, the changed position signal, and the changed data signal of the corresponding hard disk 100. The backplane 50 indicates the changed working states of the corresponding hard disk 100 by shining the corresponding indicating light 40.

Even though numerous characteristics and advantages of the present disclosure have been set forth in the foregoing description, together with details of the structure and function of the disclosure, the disclosure is illustrative only, and changes may be made in detail, especially in the matters of shape, size, and the arrangement of parts within the principles of the disclosure to the full extent indicated by the broad general meaning of the terms in which the appended claims are expressed.

What is claimed is:

1. A working states indicating apparatus comprising:
    a south bridge chip configured for storing hard disk information of a first hard disk;
    a Complex Programmable Logic Device (CPLD) controller chip configured for reading a position signal and a data signal from the hard disk information of the first hard disk, and converting the position signal and the data signal into working states signals of the first hard disk;
    a Baseboard Management Controller (BMC) chip configured for receiving the working states signals of the first hard disk; if working states of the first hard disk changes, the BMC chip decodes the working states signals of the first hard disk to a changed position signal and a changed data signal; and
    an indicating light configured for receiving the changed position signal and the changed data signal, and indicating working states of the first hard disk according to the changed position signal and the changed data signal.

2. The working states indicating apparatus of claim 1, wherein the CPLD controller chip comprises a first decoding module, a register and an edge detecting module; and the first decoding module is configured for receiving the position signal and the data signal of the first hard disk, and converting the position signal and the data signal of the first hard disk into hard disc signals identifiable by the register and the edge detecting module.

3. The working states indicating apparatus of claim 2, wherein the south bridge chip is configured for storing hard disk information of a second hard disk; the CPLD controller chip further comprises a second decoding module; and the second decoding module is configured for receiving a position signal and a data signal from the working states signals of the second hard disk, and converting the position signal and the data signal of the second hard disk into hard disc signals identifiable by the register and the edge detecting module.

4. The working states indicating apparatus of claim 3, wherein the register is configured for storing multiple predetermined data of hard disc working statues; the CPLD controller chip compares the hard disc signals with the predetermined data to identify working statues signals of a respective hard disk of the first hard disk and the second hard disk.

5. The working states indicating apparatus of claim 4, wherein the CPLD controller chip further comprises a buffer and a slave module; the register transmits the working statues signal of the respective hard disk to the slave module via the buffer; and the first decoding module and the second decoding module transmit the working statues signals of the respective hard disk to the edge detecting module.

6. The working states indicating apparatus of claim 5, wherein if working states of the respective hard disk changes, the edge detecting module outputs a write data signal and an interrupt signal to the buffer and the BMC chip respectively.

7. The working states indicating apparatus of claim 6, wherein the BMC chip comprises a master module and a General Purpose Input/Output (GPIO) module; the master module receives the working statues signals of the respective hard disk from the slave module; and the GPIO module is configured for decoding the position signal and the data signal of the respective hard disk according to the working statues signals of the first hard disk and the second hard disk.

8. The working states indicating apparatus of claim 7, wherein the indicating light is located on a backplane; the GPIO module transmits the position signal and the data signal of the respective hard disk to the backplane; and the backplane is configured for indicating working states of the respective hard disk by shining the indicating light according to the position signal and the data signal.

9. The working states indicating apparatus of claim 8, wherein the first decoding module is a SATA decoding module; the second decoding module is a SAS decoding module; the slave module is an Inter-Integrated Circuit (IIC) slave module; and the master module is an IIC master module.

10. A working states indicating apparatus comprising:
    a south bridge chip configured for storing hard disk information of the first hard disk;
    a Complex Programmable Logic Device (CPLD) controller chip configured for reading a position signal and a data signal from the hard disk information of the first hard disk, and converting the position signal and the data signal into working states signals of the first hard disk; the CPLD controller chip comprises a buffer and an edge detecting module;
    a Baseboard Management Controller (BMC) chip configured for receiving the working states signals of the first hard disk; if working states of the first hard disk changes, the edge detecting module outputs a write data signal and an interrupt signal to the buffer and the BMC chip respectively, the BMC chip decodes the working states signals of the first hard disk to a changed position signal and a changed data signal; and
    an indicating light configured for receiving the changed position signal and the changed data signal, and indicating working states of the first hard disk according to the changed position signal and the changed data signal.

11. The working states indicating apparatus of claim 10, wherein the CPLD controller chip comprises a first decoding module and a register; and the first decoding module is configured for receiving the position signal and the data signal of the first hard disk, and converting the position signal and the data signal of the first hard disk into hard disc signals which can be identified by the register and the edge detecting module.

12. The working states indicating apparatus of claim 11, wherein the south bridge chip is configured for storing hard disk information of a second hard disk; the CPLD controller chip further comprises a second decoding module; and the second decoding module is configured for receiving a position signal and a data signal from the working states signals of the second hard disk, and converting the position signal and the data signal of the second hard disk into hard disc signals which can be identified by the register and the edge detecting module.

13. The working states indicating apparatus of claim 12, wherein the register is configured for storing multiple predetermined data of hard disc working statues; the CPLD controller chip compares the hard disc signals with the predetermined data to identify working statues signal of a respective hard disk of the first hard disk and the second hard disk.

14. The working states indicating apparatus of claim 13, wherein the CPLD controller chip further comprises a slave module; the register transmits the working statues signal of the respective hard disk to the slave module via the buffer; and the first decoding module and the second decoding module transmits the working statues signals of the respective hard disk to the edge detecting module.

15. The working states indicating apparatus of claim 14, wherein the BMC chip comprises a master module and a General Purpose Input/Output (GPIO) module; the master module receives the working statues signals of the respective hard disk from the slave module; and the GPIO module is configured for decoding the position signal and the data signal of the respective hard disk according to the working statues signals of the first hard disk and the second hard disk.

16. The working states indicating apparatus of claim 15, wherein the indicating light is located on a backplane; the GPIO module transmits the position signal and the data signal of the respective hard disk to the backplane; and the backplane is configured for indicating working states of the respective hard disk by shining the indicating light according to the position signal and the data signal.

17. The working states indicating apparatus of claim 16, wherein the first decoding module is a SATA decoding module; the second decoding module is a SAS decoding module; the slave module is an Inter-Integrated Circuit (IIC) slave module; and the master module is an IIC master module.

* * * * *